July 19, 1955     H. R. STOCKS     2,713,178
WINDSCREEN WIPERS
Filed Sept. 7, 1949
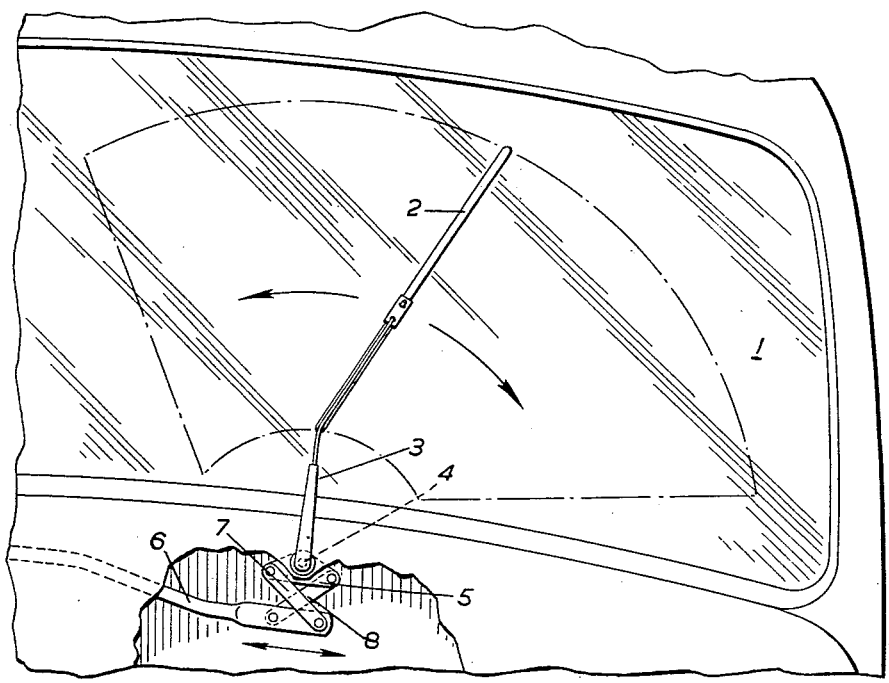
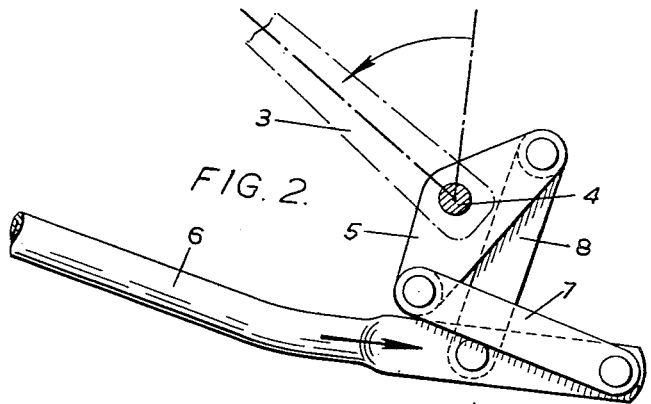
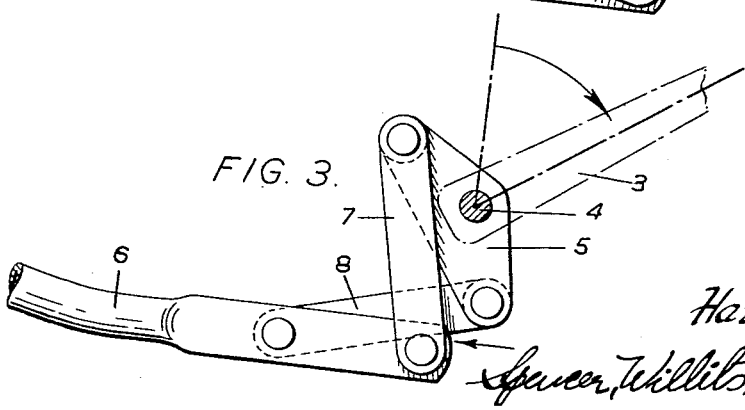
Inventor
*Harry R. Stocks*
*Spencer, Willits, Helmig & Gaille*
Attorneys

United States Patent Office 2,713,178
Patented July 19, 1955

2,713,178

WINDSCREEN WIPERS

Harry R. Stocks, Luton, England, assignor to General Motors Corporation, Detroit, Mich., a corporation of Delaware Application September 7, 1949, Serial No. 114,296

3 Claims. (Cl. 15—253)

This invention relates to mechanism for actuating the windscreen wipers of motor, road and other vehicles.

In windscreen wipers as normally constructed the arm carrying the wiper is rigidly attached to a shaft which is rotatively oscillated by a reciprocable rod or link reciprocated by some form of motor, the end of the link remote from the motor being connected to a simple crank lever keyed to the wiper shaft so that angular movements are imparted to the wiper shaft and consequently the wiper makes its backward and forward movements.

This mechanism is subject to the disability that the movement of the wiper reaches its highest velocity with respect to the velocity of the reciprocable rod towards the ends of the alternating strokes when the reversal of movement takes place. Thus the inertia effects are operating in the wrong direction which tends to cause shock resulting in "bouncing" or "dithering" of the wiper.

Further, the reciprocating link and the crank arm tend to come into alignment and may, in certain circumstances, produce an undesirable toggle effect.

According to the present invention these disabilities are obviated.

The primary characteristic of the invention is that mechanism is provided such that the angular movements of the wiper shaft, and, of course, its attached wiper arm, reach their highest velocities intermediately so that the movements towards the ends of the strokes are decelerating.

In its preferred form the invention comprises a particular form of link mechanism by means of which the reciprocations or to and fro movements of the more-or-less usual motor actuated rod or link, which is usually connected to the motor by a crank, are translated into the angular movements of the wiper shaft. The crossed link connection between the reciprocating rod and the wiper shaft described below requires that the reciprocating rod or link have a component of transverse movement. This transverse movement is provided by the usual pivotal connection between the rod or link and the crank or if the reciprocating rod or link reciprocates in a straight line it would be jointed.

In the accompanying drawings there is shown one half of a motor vehicle windscreen, having associated with it a wiper operated through the medium of mechanism according to this invention, the three figures showing the wiper in different positions.

The windscreen 1 has at each side a wiper and mechanism as shown in the drawings, operated by a centrally located prime mover (not shown) such as an electric or suction-operated motor. Each wiper comprises a wiper blade 2 pivotally attached in the usual way to a wiper arm 3 which is mounted on a shaft 4. The linkage consists of a rocker arm 5 rigidly secured intermediate its length to the wiper shaft 4. Between the rocker arm 5 and the reciprocable motor-actuated rod or link 6 are rocker links 7, 8 which cross each other. One link 7 is pivoted adjacent the end of the rod 6 remote from the actuating motor and the other link 8 is pivoted to the rod 6 intermediate its free end and the actuating motor.

Generally the wiper shaft 4 is secured at the middle of the rocker arm 5 as shown, and the distance between the pivotal points on the rocker arm 5 is equal to the distance between the pivotal points on the reciprocable rod or link, and one of the rocker links 7 lies on one side of the reciprocable rod 6, and the other link 8 on the other side, so that the reciprocable rod 6 lies between them. By this arrangement the reciprocating movements of the rod 6 rocks the rocking arm and imparts angular movements to the wiper shaft. However, in actual automotive installations such as illustrated in the drawings, the wiped area on the windshield is generally unsymmetrical with respect to the wiper shaft 4. The desired wiper blade movement is obtained by varying the length of the rocker links 7 and 8 or the distance between the rocker link pivots on the rocker arm 5 or the reciprocable rod 6 as illustrated in the drawing.

When the wiper arm 3 is in its central position (Fig. 1) the rocker arm 5 is substantially parallel to the motor actuated reciprocable rod 6. Movement of the reciprocable rod to the left (Fig. 3) rocks the rocker arm 5 to an angular position on the right; and movement of the reciprocable rod 6 to the right (Fig. 2) rocks the rocker arm 5 to a similar angular position on the left. The windscreen wiper functions in the usual way, with the difference that its movement starts comparatively slowly when the blade moves away from the end position illustrated in Fig. 2, reaches its highest velocity at the central position illustrated in Fig. 1 and slows down towards the end of the stroke illustrated in Fig. 3, and, obviously, no toggle effect is possible. This movement is made possible due to the fact that the crossed link drive shown herein not only does not change the movement of the reciprocating rod 6 which if driven by a crank is fast at the center of the path and slow at the ends of the path but substantially transfers this movement from the rod to the wiper and further reduces the speed of movement of the wiper at the end of the path.

Having now particularly described and ascertained the nature of my said invention and in what manner the same is to be performed, I declare that what I claim is:

1. Windscreen wiper actuating mechanism including in combination, a driving element movable to and fro between predetermined limit positions, an oscillatable shaft for driving a windscreen wiper, a member secured to said shaft, and a pair of angularly related links, each link being pivoted at spaced points on the link to said driving element and to said member, said pivot points on said driving element for said pair of links being spaced apart, said pivot points on said member for said pair of links being spaced apart and located on opposite sides of said shaft, and said links connecting said driving element to said member for imparting oscillation to said member and shaft upon to and fro movement of said member.

2. Windscreen wiper actuating mechanism including in combination, a driving element movable to and fro between predetermined limit positions, a wiper blade, mounting means including an oscillatable shaft to mount said wiper blade for oscillatory movement in a path, a member secured to said shaft, and a pair of angularly related links, each link being pivoted at spaced points on the link to said driving element and to said member, said pivot points on said driving element for said pair of links being spaced apart, said pivot points on said member for said pair of links being spaced apart and located on opposite sides of said shaft, and said links connecting said driving element to said member for imparting oscillation to said member and shaft upon to and fro movement of said member.

3. Windscreen wiper actuating mechanism including in combination, a driving element movable to and fro between predetermined limit positions, a wiper blade, mounting means including an oscillatable shaft to mount said wiper blade for oscillatory movement in a path, a member secured to said shaft, and a pair of crossed links, each link being pivoted at spaced points on the link to said driving element and to said member, said pivot points on said driving element for said pair of links being spaced apart, said pivot points on said member for said pair of links being spaced apart and located on opposite sides of said shaft, and said links connecting said driving element to said member for imparting oscillation to said member and shaft upon to and fro movement of said member.

References Cited in the file of this patent

UNITED STATES PATENTS

| 2,053,861 | Whitted | Sept. 8, 1936 |
| 2,232,480 | Schmid | Feb. 18, 1941 |